United States Patent [19]

Pelegri

[11] 4,107,506
[45] Aug. 15, 1978

[54] SOLDERING METHOD

[76] Inventor: Ismael Martinez Pelegri, Pasaje Dos de Mayo 20, Barcelona, Spain

[21] Appl. No.: 659,039

[22] Filed: Feb. 18, 1976

[51] Int. Cl.² .............................................. H05B 5/00
[52] U.S. Cl. .................................... 219/85 A; 219/9.5; 219/85 R; 219/85 M
[58] Field of Search .................... 219/9.5, 10.79, 85 A, 219/85 R, 85 M; 228/127, 131, 243

[56] References Cited

U.S. PATENT DOCUMENTS

| | | | |
|---|---|---|---|
| 3,481,024 | 12/1969 | Bunn | 228/127 |
| 3,609,277 | 9/1971 | Dallet et al. | 219/9.5 X |

Primary Examiner—J. V. Truhe
Assistant Examiner—M. Paschall
Attorney, Agent, or Firm—Scully, Scott, Murphy & Presser

[57] ABSTRACT

Improved methods of soldering metallic parts having a portion of their surface forming non-planar surfaces, comprising arranging coaxially therewith a metallic means having favorable electromagnetic properties and a different coefficient of expansion from that of the metallic parts so that soldering is effected by the combined action of the heat effect supplied by electromagnetic induction and by radial pressure exerted by said metallic means.

1 Claim, 4 Drawing Figures

SOLDERING METHOD

FIELD OF THE INVENTION

The present invention relates to improved methods for soldering metallic parts, of the type using a filler metal having a lower melting point than that of said metallic parts, two press plates, one of which at least has an induction winding and at least one insulating means.

These improvements are particularly applicable to the soldering of thin parts having a large surface area and wherein at least a portion of the respective surfaces to be soldered form a non-planar surface.

Electromagnetic induction soldering processes for rigid, metallic parts lacking in relief are known, since it is easy to achieve contact therebetween through a layer of filler metal having a melting point below that of the parts to be joined.

On the contrary, when the above parts have a large surface area with protuberances, such as is the particular case of the heat diffuser bases for kitchenware, provided with sidewall covering, difficulties arise which require the component members to be pressed together. The most suitable process for effecting this type of soldering is electromagnetic induction, with the induction winding being incorporated in one or both press parts. Then, when the surfaces to be joined do not lie on the same plane, the mixed heat supply and pressing process becomes considerably complicated, since, although the flat faces solder easily, the same does not occur at the sides, as a result, above all, of the different coefficients of expansion of the two metals.

SUMMARY OF THE INVENTION

It is, therefore, a primary object of the invention to provide an improved method for soldering metallic parts, wherein a metallic means having favourable magnetic characteristics and a coefficient of expansion different from that of the two metallic parts to be joined is positioned coaxially with said parts and immediately adjacent said portions of surfaces thereof forming a non-planar surface. In this way said means is heated by electromagnetic induction and transmits such heat to said metallic parts. At the same time it causes pressure contact to be established between the parts to be joined during the process, whereby the soldering action takes place under the dual action of heat and pressure in a radial direction.

In accordance with one preferred form of the method of the invention, the two metallic parts to be joined and the intermediate sheet of filler metal are held together by a press and in that case said metallic means is shaped in ring form, has a lower coefficient of expansion than the parts to be joined and operates externally thereto so as to create pressure by reaction in a radial direction, in cooperation with a press acting in an axial direction, so that said ring embraces the portion of the surfaces to be joined forming a non-planar surface, whereby the heat and pressure transmitted from said ring to said parts produces the bonding of such parts at their non-planar surface.

In accordance with a further preferred form of the method of the invention, when the metallic parts to be joined are hollow and have a cylindrical surface, said metallic means has the form of a core member, has a greater coefficient of expansion that said parts and is arranged inside said parts to exert radially directed pressure which together with the heat transmitted by conduction produces the bonding of such parts.

BRIEF DESCRIPTION OF THE DRAWINGS

Other objects and features of the invention will become manifest on reference to the detailed description and accompanying drawings wherein.

DETAILED DESCRIPTION OF THE INVENTION

Figure 1:
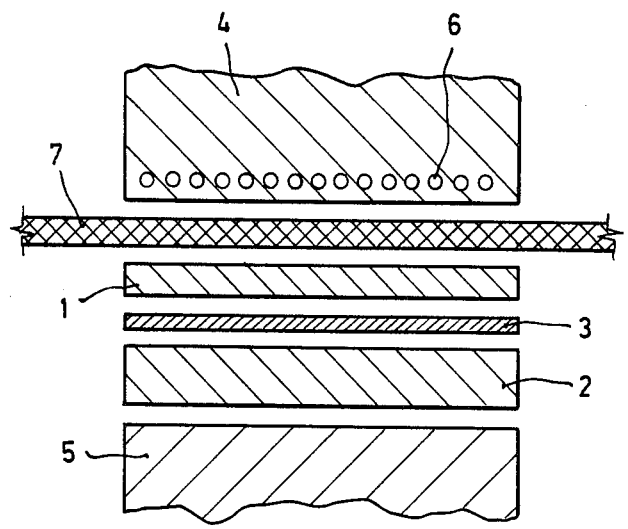
FIG. 1 is a schematic view of a known way of joining thin flat parts together by soldering.
Figure 2:
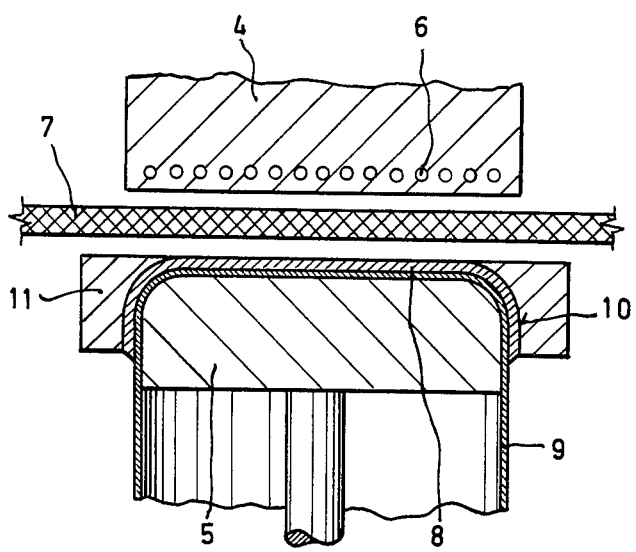
FIG. 2 is a further schematic view illustrating the method of the invention for soldering together thin parts having a portion of their surface forming a non-planar surface.

The technique for soldering thin flat metallic parts 1 and 2 through a filler metal 3 having a lower melting point is known with the use of press plates 4 and 5 wherein one or both or said plates comprises an induction winding 6, the adjacent part 1 being protected with an insulating sheet 7. Nevertheless, this known arrangement for electromagnetic induction soldering does not solve the problems raised when it is desired to solder together parts 8 and 9 which, while being thin, having a portion or portions 10 which form non-planar surfaces, for which purpose the invention contemplates the use of a metallic means 11 which embraces said portion 10 peripherally.

One example of the above circumstances is the soldering of a heat diffuser bottom to a container or when a sole plate is mounted to an electric iron.

Figure 3:
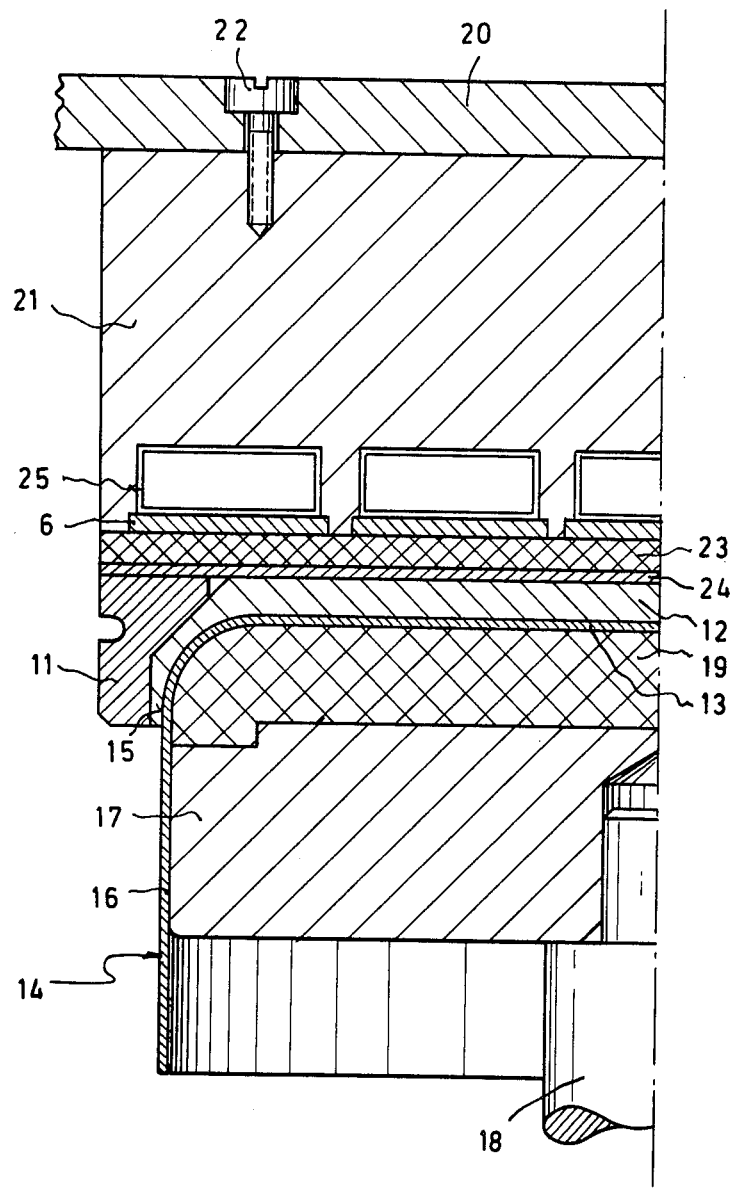
FIG. 3 illustrates a way of effecting the method of the invention for the soldering together of parts having a portion of their surface forming a non-planar surface.

The method of the invention is applicable with external or internal pressure. In the embodiment illustrated in FIG. 3 a bottom member 12 is shown as being soldered to the base 13 of a stainless steel utensil 14. The bottom 12 may be made of any metal having a good coefficient of heat transfer by conduction, such as copper or aluminium, the former offering better technical advantages whereas the latter is more advantageous from an economy point of view and keeps its appearance better with use. Thus the curved merging surface 15 between the base 13 and the wall 16 of said utensil 14 is embraced by the bottom 12, at the same time as this bottom is embraced by a steel ring 11. A press, through a plate 17 having a thrust arm 18, exerts pressure against a heat insulating member 19 inside the utensil 14, while a further plate 20 connected to an insulating support 21 by screws 22 exerts pressure through an insulating disc 23 and field balancing disc 24 on the bottom 12. The insulating support 21 comprises an induction winding 6 and conduit 25 for cooling liquid with respect to the induction winding 6 and part 12.

The parts 12 and 13 are soldered from the electromagnetic field generated in the induction winding 6 with conversion to heat which is transmitted by conduction to the ring 11 and part 12. In view of its lower coefficient of expansion relative to parts 12 and 13, the ring 11 at the same time exerts lateral pressure against part 12, allowing for mutual bonding of the parts 12 and 13 to be joined. This pressure is also initially obtained by the component transmitted by the press because of the frustoconical design. The shape of the ring 11 varies to allow for greater or lesser temperature in each case, according to the electromagnetic field to which it is subjected.

Figure 4:
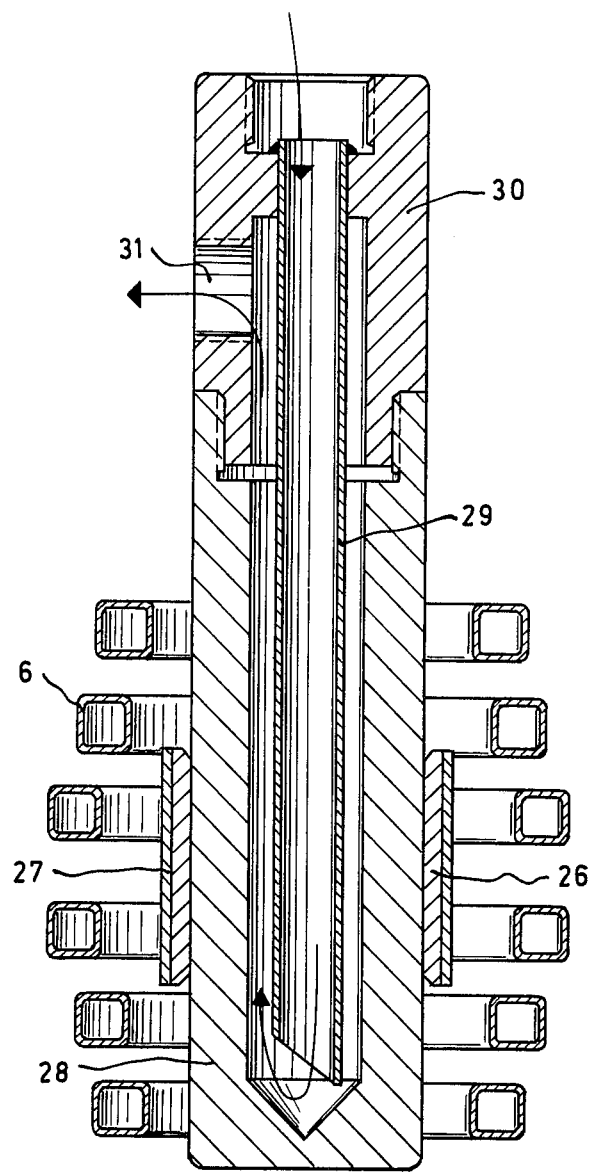
FIG. 4 illustrates a way of effecting the method for soldering together concentric cylindrical parts.

The foregoing example describes soldering with external pressure. The principles of the method according to the invention may be used for soldering with internal pressure, such as illustrated by the example of FIG. 4, where a metal bushing 26, as of bronze or lead, is to be soldered to a jacket 27 of steel or other metal. A tubular aluminium core member 28 is disposed in the central space and comprises a conduit 29 for cooling liquid proceeding from an upper connector 30 and exiting through an aperture 31, while parts 26 and 27 to be joined are within an induction winding 6.

The heat generated by the induction winding 6 is transmitted to the surfaces to be joined which is provided with a layer of filler metal, not shown, in paste form, such as tin alloys. Since the aluminium core member expands more than the parts 26 and 27 to be welded, these are pressed from the inside without deformation.

The cooling contemplated in both examples described is designed to accelerate the production rate of soldering after successive operations and may comprises water, air or both fluids simultaneously.

Having suitably described the features of the invention, it is declared that as many variations of detail as recommended by experience may be introduced therein, provided that the essence of the invention as resumed and defined in the following claims is not modified thereby.

What I claim is:

1. In a method of soldering metallic parts, of the type based on the use of a filler metal having a lower melting point than said metallic parts, of two press plates, at least one of which is provided with an induction winding and at least one insulating means, partiuclarly applicable to the soldering of thin parts having a large surface area and at least one portion of the respective surfaces forming a non-planar surface, the improvement wherein a metallic ring having an inner surface complementary to said non-planar surface, favorable magnetic characteristics and a coefficient of expansion lower than that of the two metallic parts to be joined is positioned coaxially with said parts, externally thereto, and immediately adjacent the portion thereof forming a non-planar surface, so as to create pressure by reaction in a radial direction, in cooperation with a press acting in an axial direction, so that said ring embraces the portion of the surfaces to be joined forming a non-planar surface and also that said ring means receives heat energy by electromagnetic induction and transmits said heat by conduction to said parts, whereby the heat and pressure communicated by the ring to said parts produces the bonding of said parts at the non-planar surfaces thereof.

* * * * *